United States Patent
Rothschild (10) Patent No.: US 12,208,797 B2
(45) Date of Patent: *Jan. 28, 2025

(54) TRACKING FOR TRAFFIC LIGHTS

(71) Applicant: Leigh M. Rothschild, Miami, FL (US)

(72) Inventor: Leigh M. Rothschild, Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/438,163

(22) Filed: Feb. 9, 2024

(65) Prior Publication Data

US 2024/0409092 A1 Dec. 12, 2024

Related U.S. Application Data (63) Continuation of application No. 18/332,970, filed on Jun. 12, 2023, now Pat. No. 11,926,321.

(51) Int. Cl.
| | |
|---|---|
| *B60W 30/14* | (2006.01) |
| *B60W 10/18* | (2012.01) |
| *B60W 40/04* | (2006.01) |
| *G08G 1/095* | (2006.01) |
| *G08G 1/0967* | (2006.01) |
| *H04W 4/46* | (2018.01) |

(52) U.S. Cl.
CPC .......... *B60W 30/143* (2013.01); *B60W 10/18* (2013.01); *B60W 40/04* (2013.01); *G08G 1/095* (2013.01); *G08G 1/096725* (2013.01); *G08G 1/096775* (2013.01); *H04W 4/46* (2018.02)

(58) Field of Classification Search
None
See application file for complete search history.

(56) References Cited

U.S. PATENT DOCUMENTS

| | | | |
|---|---|---|---|
| 11,590,978 B1* | 2/2023 | Akman | G06V 10/776 |
| 2021/0049907 A1* | 2/2021 | Dhillon | H04W 4/44 |
| 2023/0015880 A1* | 1/2023 | Refaat | G05D 1/0287 |
| 2024/0038068 A1* | 2/2024 | Cantas | G08G 1/096775 |

* cited by examiner

*Primary Examiner* — Peter D Nolan
*Assistant Examiner* — Demetra R Smith-Stewart
(74) *Attorney, Agent, or Firm* — Geoffrey E. Dobbin; Dobbin IP Law, P.C.

(57) ABSTRACT

The present invention relates to method and system for controlling speed of vehicle by using GPS location, real-time traffic light status and machine learning techniques to recommend cruising speed to vehicle without stopping at the traffic lights. The method includes determining status of traffic lights located on route of traffic junctions and associated time period for status of traffic lights based on data received from sensors. The method includes broadcasting status of traffic lights and associated time period. The method includes calculating in real-time a recommended cruising speed of the vehicle based on GPS location associated with vehicle, status of traffic lights and associated time period, and a time period required by vehicle to arrive at the traffic lights using machine learning techniques. The method includes providing in real-time the recommended cruising speed to vehicle. The method includes adaptively controlling in real-time speed of vehicle to recommended cruising speed.

19 Claims, 3 Drawing Sheets

TRACKING FOR TRAFFIC LIGHTS

TECHNICAL FIELD

The present invention relates to a method and a system for controlling the speed of a vehicle, and more particularly to a method and system that uses GPS location, real-time traffic light status and machine learning techniques to recommend cruising speed to the vehicle to traverse a route without stopping at any of the traffic lights.

BACKGROUND

Traffic lights are a ubiquitous feature of modern urban transportation systems. They play a critical role in managing the flow of vehicular traffic, ensuring safe and efficient movement on roads. However, the wait time at traffic lights can be a significant cause of frustration for drivers and can lead to congestion and delays on the roads.

Vehicles often must stop and wait at traffic lights while driving on a road network. This leads to increased fuel consumption, longer travel time and environmental pollution. This problem has been addressed by various technologies that aim to reduce the time spent waiting at traffic lights. Some of these technologies use smart traffic lights that use sensors to detect the presence of vehicles and adjust the duration of red and green lights to optimize traffic flow. Other technologies use vehicle-to-vehicle communication to provide real-time traffic information to nearby vehicles, allowing them to adjust their speed to minimize waiting time at traffic lights.

KR102497716B1 discloses a control server that receives driving data provided from a plurality of self-driving cars. The driving data is transmitted by detecting the behavior or environment of each of the plurality of self-driving cars, and a road on which the plurality of self-driving cars is traveling. Further, a control unit generates a recommended limit speed for individually controlling the speed of each of the plurality of self-driving cars using the driving data and the infrastructure data and transmits the generated recommended speed limit to each of the plurality of self-driving cars.

WO2022149640A1 discloses a method and a system for controlling the driving of an autonomous driving vehicle using infrastructure information, driving information of surrounding driving vehicles, and prior learning information.

IN2121MU2015A discloses a system for monitoring and decongesting traffic congestion with GPS mobility sensors which capture real time data. The captured data is used to compute congestion levels and evolve decongestion strategies like modulating signal phases or suggesting alternate routes. The signal phases are computed based on un-utilized green phases and cumulative waiting time of vehicles in each direction. The computed signal phases modulate the cycle timings of the traffic signals at every junction. Thus, traffic flow is improved by computing the green phase in real time while considering infrastructural data, vehicular data, and congestion level. The drivers of the vehicles are also suggested alternate routes in case of deadlock situation and shortest route for travelling to their destination.

A non-patent literature by Li Yan titled "Optimizing Vehicle Driving Speed with Vehicle Trajectories for Travel Time Minimization and Road Congestion Avoidance" discloses a method for optimizing the vehicles' speed on their original route. Li Yan utilizes Stackelberg game to let vehicles drive as fast and safely as possible while avoiding generating congestion on the road network. Stackelberg game is utilized between the vehicles and the central server to determine the expected vehicle density that maximizes the utilization of the road network and optimal driving speed for each vehicle.

EP2945140A1 discloses a method which enables to pass the traffic lights in a most-efficient way. The method estimates and optimizes a velocity profile of the vehicle, and an acceleration trajectory (T3) is determined for efficiently operating the powertrain of the vehicle while approaching and passing the route's traffic lights.

EP3333827 discloses an apparatus and a method for controlling a vehicle, and a semi-automatic or an automatic driving system for supporting and facilitating driving control of a vehicle.

US2011095906A1 discloses a method and an apparatus for controlling the flow of traffic. To this end, the information about the period of time before a set of traffic lights changes to another traffic light phase is used to provide the driver of a vehicle with a speed recommendation for approaching the traffic lights. In order to improve the ascertainment of the speed recommendation, provision is made for a database to be used to store the position (P) and the change times (Si) of a set of traffic lights and for the position and change times to be able to be retrieved by a vehicle via a mobile radio communication link, and for the driver of the vehicle to be provided with the speed recommendation using this information.

Traditionally, traffic lights have been controlled by pre-programmed timers, which can result in significant wait times at intersections, particularly during periods of heavy traffic. While some traffic lights are now equipped with sensors to detect the presence of vehicles and adjust their timing accordingly, these systems can be expensive to install and maintain.

However, existing technologies have limitations. Smart traffic lights are expensive to install and maintain, and they may not be available in all locations. Further, vehicle-to-vehicle communication relies on nearby vehicles to provide traffic information, and this information may not always be accurate or up to date.

As a result, there is a need for an improved system for controlling vehicles based on traffic lights status such that reduced wait times for drivers can be achieved and thus improve overall traffic flow. Further, there is a need for a system that should be cost-effective and easy to implement, while also being capable of adapting to changing traffic patterns and conditions in real time. Additionally, there is a need for a method and a system for controlling the speed of the vehicle that overcomes the limitations of existing technologies and provides real-time, accurate and up-to-date information about traffic light status.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for controlling speed of a vehicle. The method may be implemented by an electronic device including one or more processors and the electronic device may be disposed in the vehicle. The method may include receiving a GPS location associated with the vehicle, wherein the GPS location is determined using an electronic device disposed within the vehicle. The method may include determining a status of one or more traffic lights located on route of at least one or more traffic junctions and associated time period for the status of the one or more traffic lights based on data received from a plurality of sensors. The method may include broadcasting the status of one or more traffic lights and associated time period to at least one or more neighboring vehicles and a central server. The method may include calculating in real-time a recommended cruising speed of the vehicle based on the GPS location associated with the vehicle, the status of one or more traffic lights and associated time period, and a time period required by the vehicle to arrive at the one or more traffic lights using a machine learning algorithm. The method may include providing in real time the recommended cruising speed to the vehicle. The method may include adaptively controlling in real-time the speed of the vehicle to the recommended cruising speed.

According to embodiments illustrated herein, there may be provided a system that includes an electronic device, a central server and a communication network configured to control the speed of the vehicle. The system may be configured to receive a GPS location associated with the vehicle, wherein the GPS location is determined using an electronic device disposed within the vehicle. The system may be configured to determine a status of one or more traffic lights located on route of at least one or more traffic junctions and associated time period for the status of the one or more traffic lights based on data received from a plurality of sensors. The system may be configured to broadcast the status of one or more traffic lights and associated time period to at least one or more neighboring vehicles and a central server. The system may be configured to calculate in real-time a recommended cruising speed of the vehicle based on the GPS location associated with the vehicle, the status of one or more traffic lights and associated time period, and a time period required by the vehicle to arrive at the one or more traffic lights using a machine learning algorithm. The system may be configured to provide in real-time the recommended cruising speed to the vehicle. The system may be configured to adaptively control in real-time the speed of the vehicle to the recommended cruising speed.

The claimed invention is not considered abstract because it involves specific technical components and processes that are applied in a real-world context and has a practical application. The claimed invention combines various elements such as GPS technology, sensors, machine learning techniques, and real-time data processing to solve a specific technical problem related to traffic control and vehicle speed optimization. The claimed invention utilizes these technical components in a novel and non-obvious manner to provide a practical solution.

Furthermore, the use of machine learning techniques and real-time data processing distinguishes the claimed invention from mere computer processing that could be done by a human. While a human could manually analyze traffic conditions and make recommendations for vehicle speed, the proposed system automates this process using advanced computational techniques. The claimed invention incorporates real-time data from multiple sources which are not necessarily available to a human driver, applies complex processing techniques to calculate recommended speeds, and adapts the vehicle's speed in real-time based on a plurality of factors. These capabilities go beyond what a human could feasibly achieve manually and demonstrate the technological advancements and innovation involved in the claimed invention.

Specifically, the claimed invention is not considered abstract because it involves a specific and tangible application of controlling the speed of a vehicle based on real-time data from traffic lights, sensors, and other external variables. The claimed invention solves a practical problem related to traffic management and transportation efficiency.

While the claimed invention involves computer processing and machine learning techniques, it goes beyond mere computer processing that could be done by a human. The system collects and analyzes large amounts of data in real-time, considering various factors such as GPS location, traffic light status, traffic density, neighboring vehicles, and external variables like emergency vehicles and weather conditions. Such data is processed and used to calculate a recommended cruising speed that optimizes the vehicle's movement through traffic lights.

The complexity and scale of big data processing, the integration of real-time sensor data, and the use of machine learning techniques make the claimed system efficient and effective in controlling the vehicle's speed. The system's ability to continuously adapt and adjust the vehicle's speed based on changing conditions and optimize fuel efficiency and travel time sets it apart from what a human could reasonably achieve without such technological assistance.

In view of the above, the claimed invention combines specific application of technology, real-time data analysis, and adaptive control to solve a practical problem in traffic management, making it more than an abstract idea or a simple task that a human could perform without the aid of such technology.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented, and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

The present invention relates to a system and a method for controlling the speed of a vehicle based on the status of one or more traffic lights on the route. The present invention provides a system that enables the vehicle to receive real-time information about the status of the traffic lights from a central server or other neighboring vehicles and calculates and provides the recommended cruising speed to the vehicle. The system and method are designed to optimize fuel efficiency, reduce travel time, and improve safety and driver efficiency.

The system comprises a processor, sensors, and an electronic device disposed within the vehicle. The processor receives GPS location data from the electronic device and determines the status of the traffic lights on the route using data from a plurality of sensors. The sensors may include image sensors, LIDAR, and RADAR sensors, among others. The data from the sensors is subjected to pre-processing operations, correlation with data from the central server, and verification in real-time.

The status of the traffic lights, which may include red, yellow, and green colors, is determined based on the traffic density at the junction. The system calculates the estimated time to reach each traffic light based on weather conditions, accident conditions, and other obstacles on the route. The system's machine learning algorithm assigns weights to each of the datapoints in the sensor data and validates each of the datapoints by cross-referencing with the data from the central server. The machine learning algorithm computes a validity score for each datapoint and eliminates the datapoints with a validity score below a pre-defined value. The eliminated values are replaced with the data points obtained from the central server to eliminate inaccurate data.

Below is a sample calculation that demonstrates the calculation process described in the aforementioned scenario:
  Calculating estimated time to reach each traffic light:
    EstimatedTime=Distance/Speed
  Assigning weights to sensor data and validating with central server data:
    WeightedData=SensorData*WeightFactor
    ValidatedData=ValidateData (WeightedData, CentralServerData)
  Computing validity score for each data point: Validity Score=ComputeValidityScore (ValidatedData)
  Eliminating data points with validity score below a pre-defined value: FilteredData=EliminateData (ValidatedData, ValidityScoreThreshold)
  Replacing eliminated values with data points from the central server: UpdatedData=ReplaceData (FilteredData, CentralServerData)

The system broadcasts the status of the traffic lights and associated time period between neighboring vehicles and the central server. The recommended cruising speed of the vehicle is calculated in real-time based on the GPS location of the vehicle, the status of the traffic lights and associated time period, and a time period required by the vehicle to arrive at the traffic lights. The calculation of the cruising speed may also be based on the location and speed of neighboring vehicles and the traffic density at the GPS location of the vehicle. The recommended cruising speed may also be determined with external variables, including emergency vehicles on the route, construction along the route, weather conditions on the route, and stalled vehicles on the route.

The recommended cruising speed of the vehicle is displayed on an instrument cluster of the vehicle, and an audio alert may be generated to communicate the recommended cruising speed to the rider of the vehicle. The system adaptively controls the speed of the vehicle to the recommended cruising speed in real-time based on the riding mode of the vehicle, traction control status of the vehicle, and ABS inputs from the braking system of the vehicle. The system may also receive input from the rider of the vehicle to select one or more traffic lights that the vehicle is approaching for obtaining the status of the selected one or more traffic lights.

In one embodiment of the invention, the system determines the count of the traffic lights located on the route based on the data from the sensors and calculates an estimated time to reach each of the traffic lights. The system may also enable the vehicle to traverse the route without stopping at any of the traffic lights, thereby reducing travel time and improving fuel efficiency. The system may also be trained using a feedback loop based on a supervised learning mechanism, a semi-supervised learning mechanism, or an unsupervised learning mechanism.

Figure 1:
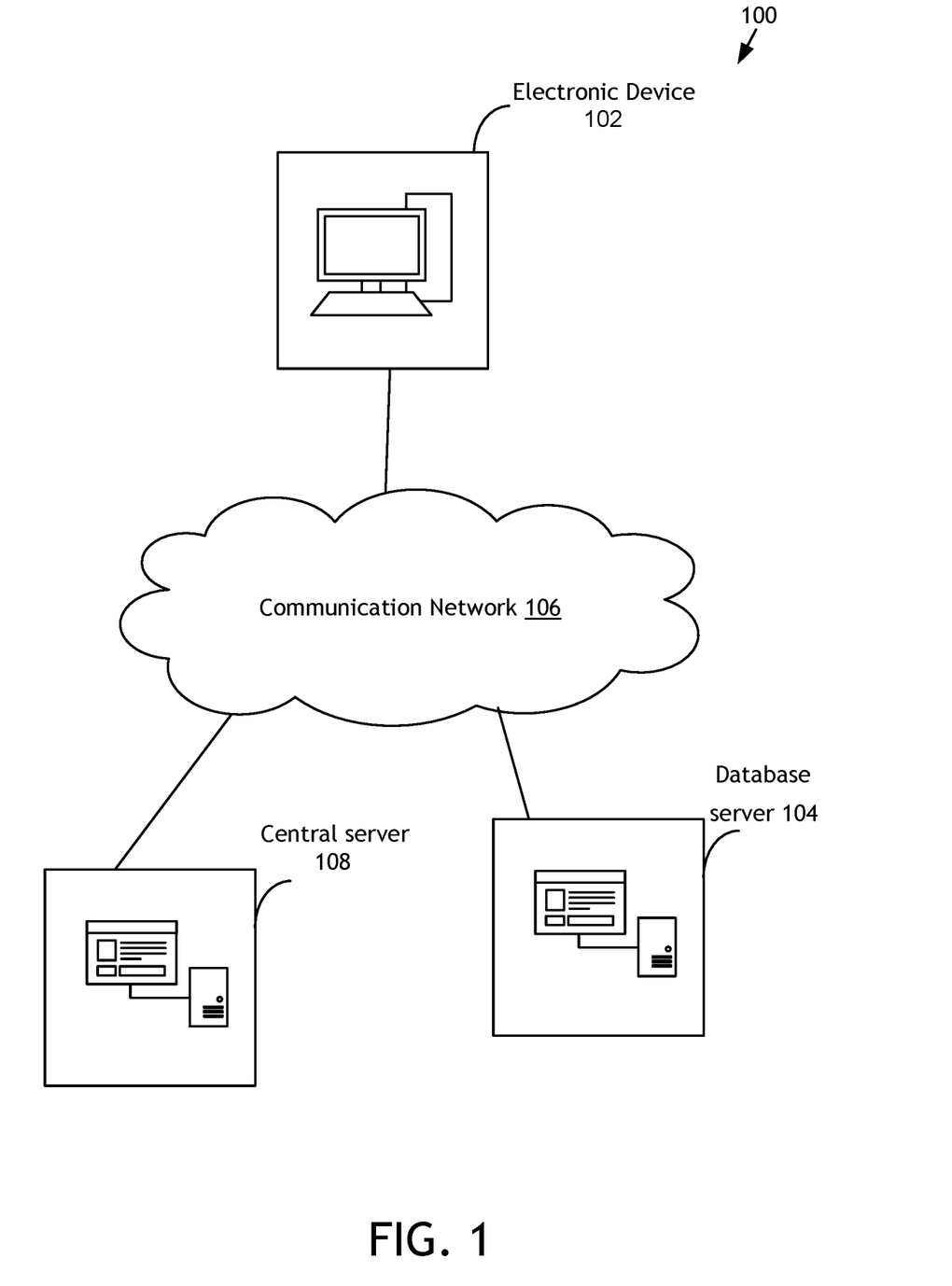
FIG. 1 is a block diagram that illustrates a system environment in which various embodiments of the method and the system may be implemented.

FIG. 1 is a block diagram that illustrates a system environment 100 in which various inventive embodiments of the method and system may be implemented. The system environment 100 typically includes an electronic device 102, a database server 104, a communication network 106, and a central server 108. The electronic device 102, the database server 104, and the central server 108 are typically communicatively coupled with each other via the communication network 106. In an embodiment, the electronic device 102 may communicate with the database server 104, and the central server 108 using one or more protocols such as, but not limited to, Open Database Connectivity (ODBC) protocol and Java Database Connectivity (JDBC) protocol.

The electronic device 102 may refer to a computing device disposed within the vehicle. The electronic device 102 may comprise of one or more processors and one or more memories. The one or more memories may include computer readable code that may be executable by the one or more processors to perform predetermined operations. In an embodiment, the electronic device 102 may present a user-interface to the rider of the vehicle for displaying a recommended cruising speed for the vehicle. Examples of the electronic device 102 may include, but are not limited to, a personal computer, a laptop, a personal digital assistant (PDA), a mobile device which may include a tablet, smart phone, or smart watch such as an Apple Watch®, the head unit built onto the vehicle, or any other computing device.

The electronic device 102 is preferably configured to receive a GPS location associated with the vehicle. In an embodiment, the GPS location is determined using an electronic device disposed within the vehicle. The electronic device 102 may be configured to determine a status of one or more traffic lights located on route of at least one or more traffic junctions and associated time period for the status of the one or more traffic lights based on data received from a plurality of sensors. The electronic device 102 may be configured to broadcast the status of one or more traffic lights and associated time period to at least one or more neighboring vehicles and a central server. The electronic device 102 may be configured to calculate in real-time a recommended cruising speed of the vehicle based on the GPS location associated with the vehicle, the status of one or more traffic lights and associated time period, and a time period required by the vehicle to arrive at the one or more traffic lights using a machine learning algorithm. The electronic device 102 may be configured to provide in real-time the recommended cruising speed or braking for the vehicle. The electronic device 102 may be configured to adaptively control in real-time, by the processor, the speed of the vehicle to the recommended cruising speed.

In an embodiment, the database server 104 may refer to a computing device that may be configured to store information comprising all vehicle related data, such as GPS location, current vehicle speed of the vehicle, and status of one or more traffic lights, a count of the one or more traffic lights located on route of the vehicle, weather conditions, accident conditions, and one or more obstacles on the route. It is to be noted that in an embodiment the database server may be located locally in the vehicle or on a cloud-based server. In an embodiment, the database server 104 may include a special purpose operating system specifically configured to perform one or more database operations on the aforementioned information. Examples of database operations may include, but are not limited to, Select, Insert, Update, Push, Pull, and Delete. In an embodiment, the database server 104 may include hardware that may be configured to perform one or more predetermined operations. In an embodiment, the database server 104 may be realized through various technologies such as, but not limited to, Microsoft® SQL Server, Oracle®, IBM DB2®, Microsoft Access®, PostgreSQL®, MySQL® and SQLite®, and the like. In an embodiment, the database server 104 may be implemented in the electronic device 102 or the central server 108.

In an embodiment, the database server 104 may be configured to transmit the aforementioned information to the electronic device 102 for data processing, via the communication network 106. In an embodiment, the database server 104 may be configured to store a recommended cruising speed for a vehicle based on a plurality of parameters associated with the vehicle. In an embodiment, the database server 104 may be configured to store the aforementioned information to be displayed to the plurality of riders of the vehicle. It is to be noted that in an embodiment the information may be also transmitted to other vehicles that are in proximity to the subject vehicle or alternatively to vehicles selected by the operator of the subject vehicle or selected by the processing system.

A person with ordinary skills in the art will understand that the scope of the disclosure is not limited to the database server 104 as a separate entity. In an embodiment, the functionalities of the database server 104 can be integrated into the electronic device 102 or the central server 108.

In an embodiment, the communication network 106 may correspond to a communication medium through which the electronic device 102, the database server 104, and the central server may communicate with each other. Such a communication may be performed in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G, 5G, 6G cellular communication protocols, and/or Bluetooth (BT) communication protocols, or satellite communication, for example. Additionally, the communication network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

The central server 108 may refer to a computing device or a software framework hosting an application or a software service. In an embodiment, the central server 108 may be implemented to execute procedures such as, but not limited to, programs, routines, or scripts stored in one or more memories for supporting the hosted application or the software service. In an embodiment, the hosted application or the software service may be configured to perform one or more predetermined operations. The central server 108 may be realized through various types of application servers such as, but are not limited to, a Java application server, a .NET framework application server, a Base4 application server, a PHP framework application server, or any other application server framework.

A person having ordinary skill in the art will appreciate that the scope of the disclosure is not limited to realizing the central server 108 and the electronic device 102 as separate entities. In an embodiment, the central server 108 may be realized as an application program installed on and/or running on the electronic device 102 and vice versa without departing from the scope of the disclosure.

Figure 2:
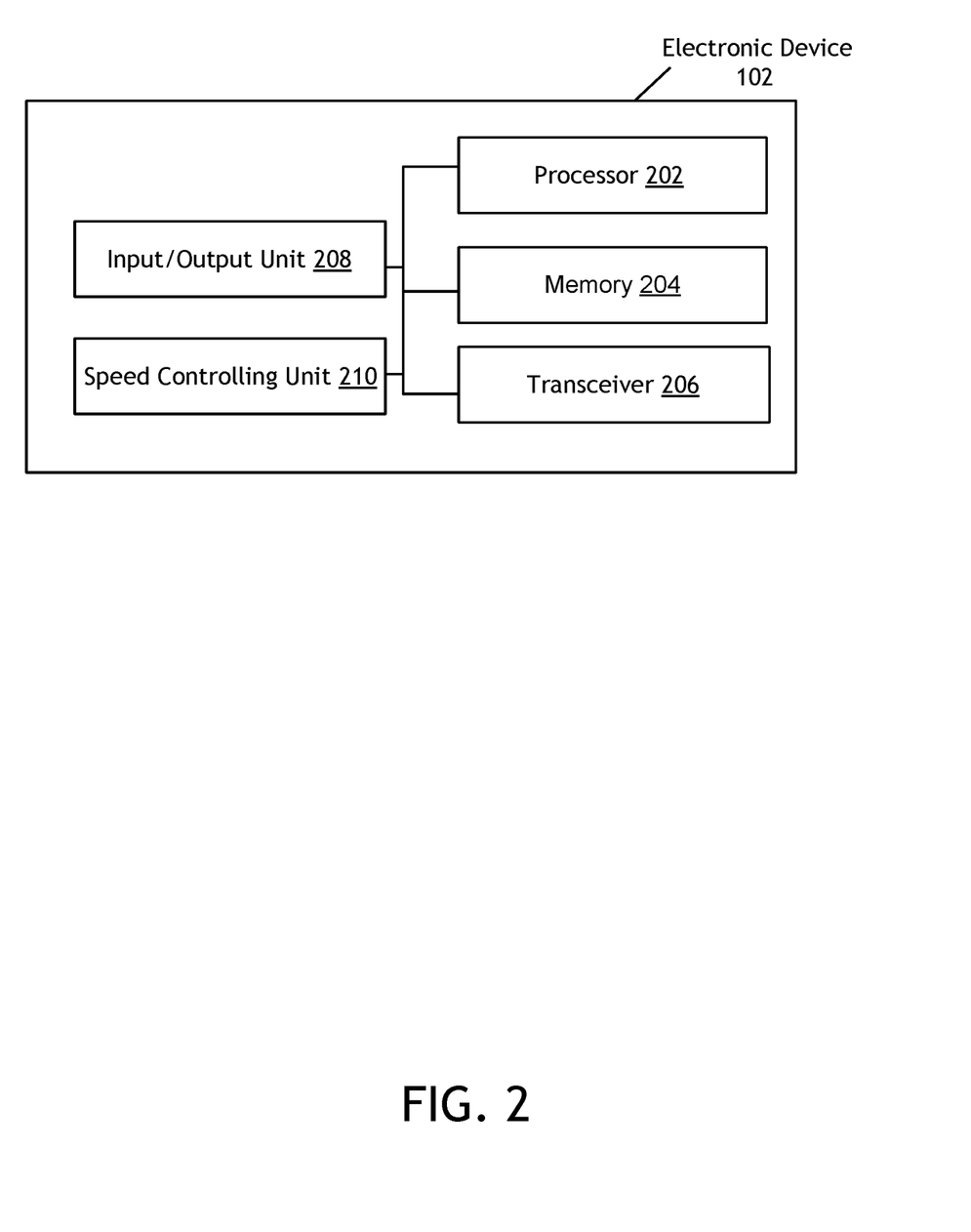
FIG. 2 is a block diagram that illustrates an electronic device configured for controlling speed of a vehicle; and, FIG. 3 is a flowchart that illustrates a method for controlling speed of the vehicle.

FIG. 2 is a block diagram that illustrates an electronic device 102 configured for controlling the speed of the vehicle. FIG. 2 is explained in conjunction with elements from FIG. 1. Here, the electronic device 102 preferably includes a processor 202, a memory 204, a transceiver 206, an input/output unit 208, and a speed controlling unit 210. The processor 202 is further preferably communicatively coupled to the memory 204, the transceiver 206, the input/output unit 208, and the speed controlling unit 210, while the transceiver 206 is preferably communicatively coupled to the communication network 106.

The processor 202 comprises suitable logic, circuitry, interfaces, and/or code that may be configured to execute a set of instructions stored in the memory 204, and may be implemented based on several processor technologies known in the art. The processor 202 works in coordination with the transceiver 206, the input/output unit 208, and the speed controlling 210 for controlling speed of the vehicle. Examples of the processor 202 include, but not limited to, an X86-based processor, a Reduced Instruction Set Computing (RISC) processor, an Application-Specific Integrated Circuit (ASIC) processor, and a Complex Instruction Set Computing (CISC) processor, among others.

The memory 204 comprises suitable logic, circuitry, interfaces, and/or code that may be configured to store the set of instructions, which are executed by the processor 202. Preferably, the memory 204 is configured to store one or more programs, routines, or scripts that are executed in coordination with the processor 202. Additionally, the memory 204 may be implemented based on a Random Access Memory (RAM), a Read-Only Memory (ROM), a Hard Disk Drive (HDD), a storage server either local or cloud based, and/or a Secure Digital (SD) card or Flash Drive.

The transceiver 206 comprises suitable logic, circuitry, interfaces, and/or code that may be configured to receive a GPS location associated with the vehicle. The transceiver 206 is preferably configured to broadcast the status of one or more traffic lights and associated time period to at least the user's vehicle (the subject vehicle) and may also broadcast to one or more neighboring vehicles and a central server. The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, audio inputs and outputs, and/or a local buffer. Also, the transceiver 206 may communicate via wireless communication with networks, such as the Internet, an Intranet and/or a wireless network, such as a cellular telephone network, a wireless local area network (LAN) and/or a metropolitan area network (MAN). Accordingly, the wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Satellite communication, Wireless Fidelity (Wi-Fi) (e.g., IEEE 802.11a, IEEE 802.11b, IEEE 802.11g and/or IEEE 802.11n), voice over Internet Protocol (VOIP), Wi-MAX, a protocol for email, instant messaging, and/or Short Message Service (SMS).

The input/output unit 208 comprises suitable logic, circuitry, interfaces, and/or code that may be configured to provide one or more inputs for controlling the speed of the vehicle. The input/output unit 208 comprises of various input and output devices that are configured to communicate with the processor 202. Examples of the input devices include, but are not limited to, a keyboard, a mouse, a joystick, a touch screen, eye tracking sensors, a microphone, a camera, and/or a docking station. Examples of the output devices include, but are not limited to, a display screen and/or a speaker. The display screen is preferably configured to: display the recommended cruising speed to the vehicle. The speaker may use audio to communicate the recommended cruising speed to the vehicle.

The speed controlling unit 210 comprises suitable logic, circuitry, interfaces, and/or code that may be configured to control the speed of the vehicle. The speed controlling unit 210 may be further configured to determining, by the processor, a status of one or more traffic lights located on route of at least one or more traffic junctions and associated time period for the status of the one or more traffic lights based on data received from a plurality of sensors. The speed controlling unit 210 may be further configured to calculating in real-time, by the processor, a recommended cruising speed and braking of the vehicle based on the GPS location associated with the vehicle, the status of one or more traffic lights and associated time period, and a time period required by the vehicle to arrive at the one or more traffic lights using a machine learning algorithm. The speed controlling unit 210 may be further configured to provide in real-time, by the processor, the recommended cruising speed to the vehicle. The speed controlling unit 210 may be further configured to adaptively control in real-time, by the processor, the speed of the vehicle to the recommended cruising speed.

In an exemplary operation, the vehicle may be traveling from an origin point to a destination point via a particular route. The route may include one or more traffic lights for traffic management. For enabling easy cruising through all the one or more traffic lights on the route of the vehicle such that fuel efficiency and driving time of the vehicle can be optimized and waiting time at the one or more traffic lights should be reduced, the claimed electronic device and the system may be configured to receive a GPS location associated with the vehicle. In an embodiment, the GPS location may be determined using the electronic device disposed within the vehicle. In an embodiment, the GPS location associated with the vehicle is transmitted to the central server.

After the GPS location is received, the system may be configured to receive a plurality of parameters from a plurality of sensors disposed on the vehicle. In an embodiment, the plurality of sensors comprises one or more image sensors, a LIDAR sensor, and a RADAR sensor. For example, the one or more image sensors may be configured to determine a status of the traffic within the immediate vicinity of the vehicle, or a number of neighboring vehicles around the vehicle. Further, the LIDAR sensor, and a RADAR sensor may be configured to determine a distance between the vehicle and each of the neighboring vehicles.

Once the GPS location and the plurality of parameters from the plurality of sensors are received then one or more operations may be performed on the data received from the plurality of sensors. In an embodiment, the one or more operations comprises pre-processing operations, correlating the data from the plurality of sensors and from the central server, verifying in real-time the data. Further, the system is configured to determine a count of the one or more traffic lights located on route of the vehicle based on the data from plurality of sensors. By example, when the route for travelling is identified then it may be identified that there are 9 traffic lights enroute.

After the enroute count of the one or more traffic lights is determined then the system calculates an estimated time to reach each of the one or more traffic lights based on weather conditions, accident conditions, construction on the route, emergency vehicles. and one or more obstacles on the route using the machine learning model. For example, considering that it is raining and at one of the intersections where one of the 9 traffic lights is present where an accident has been reported and thus a congestion, in such a situation time required to reach each of the one or more traffic lights is calculated based on the current vehicle speed and the maximum speed at one or more paths enroute.

After computing the estimated time to reach each of the one or more traffic lights, the system may be configured to determine a status of the one or more traffic lights located on route of at least one or more traffic junctions and associated time period for the status of the one or more traffic lights based on data received from the plurality of sensors. In an embodiment, the status of the one or more traffic lights is indicated using a red color, a yellow color, and a green color. In an embodiment, the one or more traffic lights may be configured to change the status dynamically based on the traffic density at a particular traffic junction.

In a working example, if the rider of the vehicle wants to determine the status of any of the 9 traffic lights enroute then the rider may provide an input to the electronic device of the vehicle to select one or more traffic lights that the vehicle is approaching for obtaining the status of the selected one or more traffic lights. For such a functionality, a user interface may be provided to the user and on route all the one or more traffic lights may be displayed on the user interface and when the rider clicks/touches or identifies by voice command any of the traffic lights then time required to reach a particular traffic status based on the status of the previous one or more traffic lights may be provided. Further, the status of one or more traffic lights and associated time period to at least one or more neighboring vehicles and a central server may be broadcasted.

Post determining the status of the one or more lights, the system may be configured to calculate in real-time a recommended cruising speed and braking of the vehicle based on the GPS location associated with the vehicle, the status of one or more traffic lights and associated time period, and a time period required by the vehicle to arrive at the one or more traffic lights using a machine learning algorithm. In an embodiment, the machine learning model is configured to assign weights to each of the datapoints in the data from the plurality of sensors and validate each of the datapoints by cross referencing with the data from the central server Further, the machine learning model is configured to compute a validity score for each datapoints in the data from the plurality of sensos and eliminate one or more data points associated with a validity score being less than a pre-defined value. Further, the machine learning model is configured to replace the eliminated values with the data points obtained from the central server to eliminate inaccurate data. In an embodiment, the machine learning model is trained using a feedback loop in realtime using at least one of a supervised learning mechanism, a semi-supervised learning mechanism or an unsupervised learning mechanism.

In an embodiment, the calculation of the cruising speed of the vehicle is based on at least one of a location of the one or more neighboring vehicles, a speed of the one or more neighboring vehicles, a traffic density associated with the GPS location of the vehicle. In an embodiment, the calculation of the recommended cruising speed and braking of the vehicle is based on at least one or more external variables including general traffic congestion, emergency vehicles on the route, accidents, weather conditions on the route, construction along the route, and stalled vehicles on the route.

In a working example, let us consider that we have a vehicle equipped with multiple sensors, including GPS, speed sensors, and traffic light image sensors. The vehicle is traveling on a road with several traffic lights. The system is designed to calculate a recommended cruising speed and braking for the vehicle based on the status of the traffic lights, the time required for the vehicle to reach each traffic light, and the external variables such as the presence of emergency vehicles, accidents, construction along the route, weather conditions, and stalled vehicles on the route.

Assume that the vehicle is currently located at GPS coordinates (40.7128° N, 74.0060° W) and is approaching a traffic light at GPS coordinates (40.7151° N, 74.0092° W) with a distance of 500 meters. The system determines the status of the traffic light to be red, based on the data collected from the traffic light sensor.

The system then uses the machine learning model to calculate a recommended cruising speed for the vehicle. The machine learning model takes into account the GPS location of the vehicle, the status of the traffic light, and the time required for the vehicle to reach the traffic light. The machine learning model also assigns weights to each of the data points collected from the various sensors, cross-references them with the data from the central server, and computes a validity score for each data point. Data points with low validity scores are eliminated, and the eliminated values are replaced with the data points obtained from the central server. The data can be processed through the machine learning model or the functional equivalent several times to validate the validity scores. This processing can be done in real time or on a delayed basis.

The machine learning model also takes into account external variables such as general traffic congestion, the presence of emergency vehicles, weather conditions, accidents along the route and stalled vehicles on the route. For example, if there is an emergency vehicle approaching from the opposite direction, the system may recommend a lower cruising speed to avoid potential collisions.

Based on these factors, the system recommends a cruising speed of 40 mph (64.4 km/h) for the vehicle to reach the traffic light just as it turns green. If the system detects a change in the status of the traffic light or an external variable, it adjusts the recommended cruising speed in real-time to optimize the vehicle's journey.

Further, the system may be configured to provide in real-time the recommended cruising speed to the vehicle. In an embodiment, the recommended cruising speed of the vehicle enables traversing the route without stopping at any of the one or more traffic lights. In an embodiment, the recommended cruising speed is calculated by the central server and provided to the vehicle. The driver may elect to utilize this recommendation or alternatively they may override it.

In an embodiment, providing the recommended cruising speed to the vehicle comprises at least one of displaying the recommended cruising speed on an instrument cluster of the vehicle and/or generating an audio alert to communicate the recommended cruising speed to a rider of the vehicle. Further, the system may be configured to adaptively control in real-time the speed of the vehicle to the recommended cruising speed. In an embodiment, adaptively controlling in real-time the speed of the vehicle based on a riding mode of the vehicle, traction control status of the vehicle, ABS inputs from a braking system of the vehicle. The adaptively controlling comprises at least one of accelerating the vehicle from a current vehicle speed to the recommended cruising speed by increasing a throttle of the vehicle or decelerating the vehicle from the current vehicle speed to the recommended cruising speed by application of braking. In an embodiment, the adaptive controlling of the vehicle improves fuel efficiency and travel time of the vehicle.

In another working example, let us consider that there is a smart city that has implemented a traffic management system that includes the features described in the patent. The system has been installed in a fleet of electric vehicles that are used for transportation within the city.

When a vehicle approaches a traffic light, the system uses sensors to determine the status of the light, whether it is green, yellow or red. The system also considers the GPS location of the vehicle, the status of neighboring vehicles, the traffic density, the time period required for the vehicle to arrive at the traffic light and other external factors such as general traffic congestion, emergency vehicles, weather conditions and stalled vehicles on the route. Based on this information, the system calculates a recommended cruising speed for the vehicle that will enable it to traverse the route without stopping at any traffic lights.

The recommended cruising speed is then communicated in real-time to the vehicle via the instrument cluster or an audio alert. The system also adaptively controls the speed of the vehicle to the recommended cruising speed based on the riding mode, traction control status and ABS inputs from the braking system. The vehicle accelerates or decelerates based on the recommendations, which improves fuel efficiency and travel time.

For example, let's say that a vehicle is traveling in a busy downtown area during rush hour. The traffic management system detects heavy traffic and determines that the vehicle is likely to encounter a series of red lights if it continues at its current speed. The system recommends a cruising speed of 30 mph (48.3 km/h), which will enable the vehicle to traverse the route without stopping at any of the traffic lights. The recommended cruising speed is displayed on the instrument cluster and the vehicle accelerates or decelerates to maintain the recommended speed. For example, if the vehicle cruising current speed is 40 mph (64.4. km/h), then the braking system may be controlled to decelerate and drive the vehicle at the recommended cruising speed of 30 mph (48.3 km/h). This improves the efficiency of the vehicle and reduces travel time, as the vehicle is not forced to stop at any traffic lights. In another embodiment the cruising speed may vary along the route.

A person skilled in the art will understand that the scope of the disclosure is not limited to providing multimodal content to a first user based on the aforementioned factors and using the aforementioned techniques, and that the examples provided do not limit the scope of the disclosure.

Figure 3:
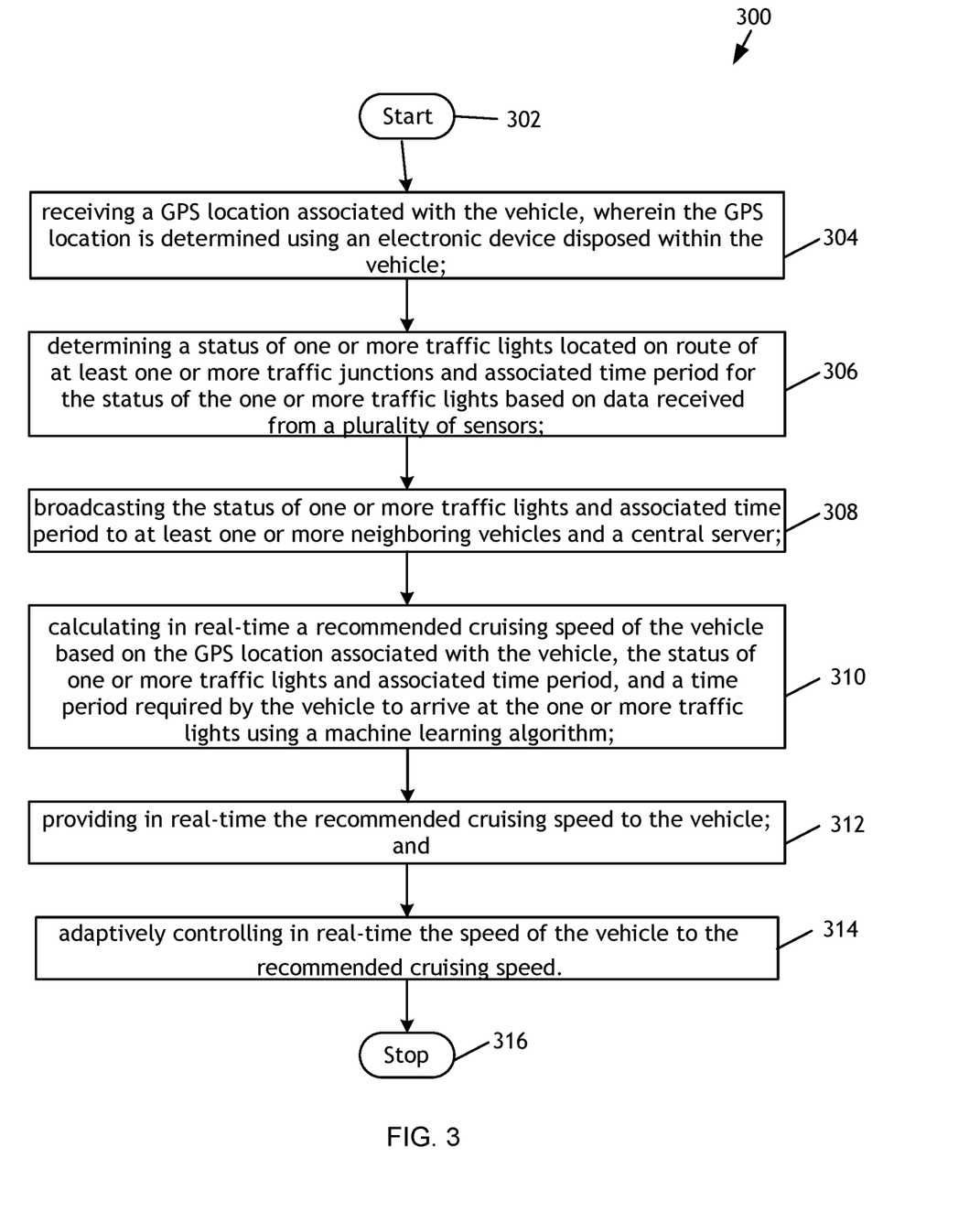

FIG. 3 is a flowchart that illustrates a method 300 for controlling the speed of the vehicle. The method begins in a Start step 302 and proceeds to a step 304.

At step 304, the electronic device is configured to receive, by the processor, a GPS location associated with the vehicle. In an embodiment, the GPS location is determined using an electronic device disposed within the vehicle. At step 306, the electronic device is configured to determining, by the processor, a status of one or more traffic lights located on route of at least one or more traffic junctions and associated time period for the status of the one or more traffic lights based on data received from a plurality of sensors. At step 308, the electronic device is configured to broadcast, by the processor, the status of one or more traffic lights and associated time period to at least one or more neighboring vehicles and the central server.

At step 310, the electronic device is configured to calculating in real-time, by the processor, a recommended cruising speed of the vehicle based on the GPS location associated with the vehicle, the status of one or more traffic lights and associated time period, and a time period required by the vehicle to arrive at the one or more traffic lights using a machine learning algorithm. At step 312, the electronic device is configured to provide in real-time, by the processor, the recommended cruising speed to the vehicle. At step 314, the electronic device is configured to adaptively control in real-time, by the processor, the speed and braking of the vehicle to the recommended cruising speed. Control passes to end step 316.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Various embodiments of the disclosure encompass numerous advantages including methods and systems for controlling speed of the vehicle. The disclosed method and system have several technical advantages that are significant improvements of the prior art but not limited to the following:

Real-time traffic light status: The method and system enables the real-time determination of the status of traffic lights on the route of the vehicle. By collecting data from a plurality of sensors, the system can determine the status of traffic lights and their associated time periods and broadcast this information to neighboring vehicles and the central server.

Real-time recommendation of cruising speed: Based on the traffic light status and associated time periods, the GPS location of the vehicle, and other external variables, the method can calculate a recommended cruising speed in real-time using a machine learning algorithm. This enables the vehicle to adjust its speed to optimize travel time and fuel efficiency, without the need for the driver to constantly monitor traffic lights and make speed adjustments.

Improved fuel efficiency and travel time: By adaptively controlling the speed of the vehicle based on the recommended cruising speed, the method can improve the fuel efficiency and travel time of the vehicle. This is especially useful in urban areas where traffic lights are prevalent and frequent stops and starts can decrease fuel efficiency.

Use of machine learning: The method utilizes a machine learning algorithm to calculate the recommended cruising speed, which can improve the accuracy of the calculations and enable the system to learn from real-world data. It is to be noted that the algorithm or algorithms may be repeatedly inputted with data to determine realtime conditions and to validate and optimize a data solution.

Integration with vehicle systems: The method can integrate with various vehicle systems, such as the instrument cluster and braking system, to provide real-time recommendations and adaptively control the speed of the vehicle based on the riding mode, traction control status, and ABS inputs.

Customization: The method provides flexibility for the driver by allowing them to select specific traffic lights to obtain the status of and also provides options for displaying the recommended cruising speed, either visually or audibly, based on driver preference.

Communication with other Vehicles: The method provides the ability to communicate traffic conditions and to make recommendations for optimum cruising speeds along the route. This communication can be synchronous such as the synchronous data link control (sdlc) so that each vehicle is supplying data to the other.

As illustrated above, the method and system provides an efficient and effective way to optimize the speed of a vehicle in urban environments, improving fuel efficiency, travel time, and overall driving experience for a rider of the vehicle. Thus, the claimed improved system for controlling vehicles based on traffic lights status reduces wait times for drivers, improves overall traffic flow in a more cost-effective and easier to implement manner. Additionally, the claimed method and system for controlling the speed of the vehicle overcomes the limitations of existing technologies and provides real-time, accurate and up-to-date information about traffic light status.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit or multiple integrated circuits that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments falling within the scope of the appended claims.

What is claimed is:

1. A method for controlling speed of a vehicle, the method comprising:
   receiving, by a processor, a GPS location associated with the vehicle, wherein the GPS location is determined using an electronic device disposed within the vehicle;
   determining, by the processor, a status of at least one traffic light located on route of at least one traffic junctions and associated time period for the status of the at least one traffic lights based on data received from a plurality of sensors;
   broadcasting, by the processor, the status of at least one traffic light and associated time period to at least one neighboring vehicle and a central server;
   calculating in real-time, by the processor, a recommended cruising speed of the vehicle based on the GPS location associated with the vehicle, the status of at least one traffic light and associated time period, and a time period required by the vehicle to arrive at the at least one traffic lights using a machine learning algorithm said machine learning algorithm being trained using a feedback loop using at least one mechanism selected from the set of mechanisms consisting of: supervised learning mechanism, a semi-supervised learning mechanism and an unsupervised learning mechanism;
   providing in real-time, by the processor, the recommended cruising speed to the vehicle; and
   adaptively controlling in real-time, by the processor, the speed of the vehicle to the recommended cruising speed.

2. The method for controlling speed of the vehicle as claimed in claim 1, wherein the GPS location associated with the vehicle is transmitted to the central server.

3. The method for controlling the speed of the vehicle as claimed in claim 1, wherein the vehicle's braking is controlled by the processor.

4. The method for controlling speed of the vehicle as claimed in claim 1, wherein the calculation of the cruising speed of the vehicle is based on at least one variable selected from the set of variables consisting of: a location of the at least one neighboring vehicle, a speed of the at least one neighboring vehicle, a traffic density associated with the GPS location of the vehicle.

5. The method for controlling speed and braking of the vehicle as claimed in claim 1, wherein the calculation of the recommended cruising speed of the vehicle is based on at least one external variable selected form the set of external variables consisting of:
   general traffic congestion, external variables including emergency vehicles on the route, accidents along the route, weather conditions on the route, and stalled vehicles on the route.

6. The method for controlling speed of the vehicle as claimed in claim 1, wherein the recommended cruising speed of the vehicle enables traversing the route without stopping at any of the at least one traffic light.

7. The method for controlling speed of the vehicle as claimed in claim 1, wherein the recommended cruising speed is calculated by the central server and provided to the vehicle.

8. The method for controlling speed of the vehicle as in claim 6 wherein the central server uses a machine language algorithm to determine the speed.

9. The method for controlling speed of the vehicle as claimed in claim 1, wherein providing the recommended cruising speed to the vehicle comprises at least one notification selected from the set of notifications consisting of: displaying the recommended cruising speed on an instrument cluster of the vehicle; and generating an audio alert to communicate the recommended cruising speed to a rider of the vehicle.

10. The method for controlling speed of the vehicle as claimed in claim 1, wherein at least one operation is performed on the data received from the plurality of sensors, wherein the at least one operation is selected from the set of operations consisting of: pre-processing operations, correlating the data from the plurality of sensors and from the central server, and verifying in real-time the data.

11. The method for controlling speed of the vehicle as claimed in claim 1, wherein the plurality of sensors comprises at least one sensor selected from the set of sensors consisting of: an image sensor, a LIDAR sensor, and a RADAR sensor.

12. The method for controlling speed of the vehicle as claimed in claim 1, further comprising:

determining a count of the at least one traffic light located on route of the vehicle based on the data from plurality of sensors; and calculating an estimated time to reach each of the at least one traffic light based on weather conditions, accident conditions, and at least one obstacle on the route using the machine learning model.

13. The method for controlling speed of the vehicle as claimed in claim 1, wherein the at least one traffic light is configured to change the status dynamically based on the traffic density at a particular traffic junction.

14. The method for controlling speed of the vehicle as claimed in claim 1, wherein the machine learning model is configured to:

assign weights to each of the datapoints in the data from the plurality of sensors and validate each of the datapoints by cross referencing with the data from the central server;

compute a validity score for each datapoints in the data from the plurality of sensos;

eliminate at least one data point associated with a validity score being less than a pre-defined value;

replacing the eliminated values with the data points obtained from the central server to eliminate inaccurate data.

15. The method for controlling speed of the vehicle as claimed in claim 1, wherein adaptively controlling in real-time the speed of the vehicle is based on at least one quantum of data selected from the set of quanta consisting of: a riding mode of the vehicle, traction control status of the vehicle, and ABS inputs from a braking system of the vehicle.

16. The method for controlling speed of the vehicle as claimed in claim 1, further comprising receiving an input from the rider of the vehicle to select at least one traffic light that the vehicle is approaching for obtaining the status of the selected at least one traffic light.

17. The method for controlling speed of the vehicle as claimed in claim 1, wherein adaptively controlling comprises at least one control technique selected from the set of control techniques consisting of: accelerating the vehicle from a current vehicle speed to the recommended cruising speed by increasing a throttle of the vehicle; and, decelerating the vehicle from the current vehicle speed to the recommended cruising speed by application of braking.

18. An electronic device to control speed of the vehicle, the electronic device comprising:

a hardware processor; and a memory communicatively coupled to the hardware processor, wherein the memory stores processor instructions, which, on execution, causes the hardware processor to:

receive a GPS location associated with the vehicle, wherein the GPS location is determined using an electronic device disposed within the vehicle;

determine a status of at least one traffic light located on route of at least one traffic junction and associated time period for the status of the at least one traffic light based on data received from a plurality of sensors;

broadcast the status of at least one traffic light and associated time period to at least one neighboring vehicle and a central server;

calculate in real-time a recommended cruising speed of the vehicle based on the GPS location associated with the vehicle, the status of at least one traffic light and associated time period, and a time period required by the vehicle to arrive at the at least one traffic light using a machine learning algorithm, said machine learning algorithm being trained using a feedback loop using at least one mechanism selected from the set of mechanisms consisting of: supervised learning mechanism, a semi-supervised learning mechanism and an unsupervised learning mechanism;

provide in real-time the recommended cruising speed to the vehicle; and adaptively control in real-time the speed of the vehicle to the recommended cruising speed.

19. A non-transitory computer readable medium including instruction stored thereon that when processed by at least one hardware processor cause an electronic device to perform an operation comprising:

receiving a GPS location associated with the vehicle, wherein the GPS location is determined using an electronic device disposed within the vehicle;

determining a status of at least one traffic light located on route of at least one traffic junction and associated time period for the status of the at least one traffic light based on data received from a plurality of sensors;

broadcasting the status of at least one traffic light and associated time period to at least one neighboring vehicle and a central server;

calculating in real-time a recommended cruising speed of the vehicle based on the GPS location associated with the vehicle, the status of at least one traffic light and associated time period, and a time period required by the vehicle to arrive at the at least one traffic light using a machine learning algorithm, said machine learning algorithm being trained using a feedback loop using at least one mechanism selected from the set of mechanisms consisting of: supervised learning mechanism, a semi-supervised learning mechanism and an unsupervised learning mechanism;

providing in real-time the recommended cruising speed to the vehicle; and adaptively controlling in real-time the speed of the vehicle to the recommended cruising speed.

\* \* \* \* \*